(12) United States Patent
Wu et al.

(10) Patent No.: US 11,375,689 B2
(45) Date of Patent: Jul. 5, 2022

(54) DOUBLE-SHOCKPROOF SPRING MECHANISM, CAM EJECTION MECHANISM AND SINGLE-SIDE GUIDE RAIL EJECTION BIN

(71) Applicant: BEIJING KITTEN&PUPPY TECHNOLOGY CO., LTD., Beijing (CN)

(72) Inventors: Jin Wu, Beijing (CN); Wenfeng Hu, Beijing (CN); Xin Hu, Beijing (CN)

(73) Assignee: BEIJING KITTEN&PUPPY TECHNOLOGY CO., LTD., Beijing (CN)

( * ) Notice: Subject to any disclaimer, the term of this patent is extended or adjusted under 35 U.S.C. 154(b) by 11 days.

(21) Appl. No.: 17/260,341

(22) PCT Filed: Jul. 8, 2020

(86) PCT No.: PCT/CN2020/100801
§ 371 (c)(1),
(2) Date: Jan. 14, 2021

(87) PCT Pub. No.: WO2021/109569
PCT Pub. Date: Jun. 10, 2021

(65) Prior Publication Data
US 2022/0132798 A1    May 5, 2022

(30) Foreign Application Priority Data

Dec. 4, 2019 (CN) .......................... 201922150940.X
Dec. 4, 2019 (CN) .......................... 201922150963.0
Dec. 4, 2019 (CN) .......................... 201922151008.9

(51) Int. Cl.
*A01K 5/02* (2006.01)
*B65D 83/04* (2006.01)
(Continued)

(52) U.S. Cl.
CPC ............ *A01K 5/02* (2013.01); *B65D 83/0409* (2013.01); *F16F 7/00* (2013.01); *F16F 9/00* (2013.01)

(58) Field of Classification Search
CPC ......... A01K 5/004; A01K 5/0275; F16F 7/00; F16F 9/00; B65D 83/0409
See application file for complete search history.

(56) References Cited

U.S. PATENT DOCUMENTS 5,272,931 A * 12/1993 Daniel .................... F16H 61/24
                                                          74/473.1
5,620,172 A *  4/1997 Fulks .................... F16F 9/3235
                                                          267/221
(Continued)

FOREIGN PATENT DOCUMENTS

CN       201651144 U     11/2010
CN       205105970 U      3/2016
(Continued)

*Primary Examiner* — Vishal R Sahni
(74) *Attorney, Agent, or Firm* — Bayramoglu Law Offices LLC (57) ABSTRACT

A double-shockproof spring mechanism, a cam ejection mechanism and a single-side guide rail ejection bin, which relates to the technical field of pet snack device components. The double-shockproof spring comprises a guide rod and a first elastic element, a slider and a second elastic element which are sleeved on the guide rod in sequence, wherein the slider is slidable along the guide rod under the action of the first elastic element and the second elastic element; the cam ejection mechanism comprises a power device, an ejection cam, a pushing plate and a double-shockproof spring mechanism; and the single-side guide rail ejection bin comprises an ejection bin body and a cam ejection mechanism mounted on the ejection bin body; the single-side guide rail ejection bin of the present invention not only can project pet snacks, but also project periodically and continuously.

9 Claims, 5 Drawing Sheets

(51) Int. Cl.
*F16F 7/00* (2006.01)
*F16F 9/00* (2006.01)

(56) References Cited

U.S. PATENT DOCUMENTS

| | | | |
|---|---|---|---|
| 9,980,463 B2 * | 5/2018 | Milner | A01K 5/0225 |
| 2016/0257481 A1 | 9/2016 | Milner et al. | |

FOREIGN PATENT DOCUMENTS

| | | | |
|---|---|---|---|
| CN | 206061811 U | 4/2017 | |
| CN | 110833043 A | 2/2020 | |
| CN | 211210957 U | 8/2020 | |
| WO | WO-2018058232 A1 * | 4/2018 | A01K 1/0209 |

* cited by examiner

DOUBLE-SHOCKPROOF SPRING MECHANISM, CAM EJECTION MECHANISM AND SINGLE-SIDE GUIDE RAIL EJECTION BIN

CROSS REFERENCE TO RELATED APPLICATION

This application is for entry into the U.S. National Phase under §371 for International Application No. PCT/CN2020/100801 having an international filing date of Jul. 8, 2020, and from which priority is claimed under all applicable sections of Title 35 of the United States Code including, but not limited to, Sections 120, 363, and 365(c) and which in turn claims priority under 35 USC 119 to Chinese Patent Applications No. 201922150963.0 filed on Dec. 4, 2019, No. 201922151008.9 filed on Dec. 4, 2019, and No. 201922150940.X file on Dec. 4, 2019.

TECHNICAL FIELD

The present invention relates to the technical field of pet snack device components, in particular to a double-shockproof spring mechanism, a cam ejection mechanism and a single-side guide rail ejection bin.

BACKGROUND

Nowadays, many families have pets such as cats and dogs. For people, these pets are not only companions in life, but also enjoy the love and care of family members like a family member. Nowadays, with the continuous progress of science and technology, pet snack devices such as pet feeding machines and pet food projecting machines have appeared in the market. These pet snack devices mainly feed pets automatically and have poor interaction with pets. However, in daily life, people usually throw pet snacks to interact with pets. On the one hand, interacting with pets in this way can keep pets in a happy mood, while on the other hand, it can play a role in training pets. Therefore, a pet snack device component that can interact with pets by throwing food has gradually become a trend.

SUMMARY

One of the objects of the present invention is to provide a double-shockproof spring mechanism to solve the technical problems of unstable projection process and large vibration of the traditional projecting mechanism in the prior art. Many technical effects that can be produced by the preferred technical scheme among many technical schemes according to the present invention (the double-shockproof spring mechanism comprises mounting sleeves, and the number of the mounting sleeves, the guide rods, the first elastic elements and the second elastic elements are all set to two, which further increases the sliding stability and the shockproof effect of the slider and can effectively increase the projection strength at the same time; a guide hole and a mounting hole penetrate through the end surface of the mounting sleeve; on the one hand, the guide hole is matched with the guide rod in size and slides stably, while on the other hand, one end of the second elastic element is provided in the mounting hole, and the mounting is stable to ensure the shockproof effect of the second elastic element) will be described in detail hereinafter.

In order to achieve the above object, the present invention provides the following technical scheme.

The present invention provides a double-shockproof spring mechanism, comprising a guide rod, a first elastic element, a slider and a second elastic element, wherein: the guide rod is provided at one side of the ejection bin body; the first elastic element, the slider and the second elastic element are all sleeved on the guide rod, the slider is provided between the first elastic element and the second elastic element, both ends of the slider are respectively abutted against the first elastic element and the second elastic element, and the slider is slidable along the guide rod under the action of the first elastic element and the second elastic element.

Preferably, the double-shockproof spring mechanism comprises a mounting sleeve, the mounting sleeve is sleeved on the guide rod, the mounting sleeve is provided between the slider and the second elastic element, the number of the mounting sleeves, the guide rods, the first elastic elements and the second elastic elements are all set to two, and two sliding holes penetrate through the end surface of the slider, wherein: the two guide rods are provided on one side of the ejection bin body in parallel and pass through the corresponding sliding holes, respectively; the two first elastic elements are sleeved on the corresponding guide rods and are abutted against the sliders, respectively; the two second elastic elements are sleeved on the corresponding guide rods and are abutted against the sliders through the corresponding mounting sleeves, respectively.

Preferably, a guide hole and a mounting hole penetrate through the end surface of the mounting sleeve, wherein: a center line of the mounting hole and a center line of the guide hole are provided on the same straight line; the aperture of the guide hole is matched with the diameter of the guide rod, and the mounting sleeve is sleeved on the guide rod through the guide hole; the aperture of the mounting hole is larger than the outer diameter of the second elastic element, and the end of the second elastic element is provided in the mounting hole.

The double-shockproof spring mechanism according to the present invention has at least the following beneficial effects.

The double-shockproof spring mechanism comprises a guide rod, a first elastic element, a slider and a second elastic element, wherein the guide rod is provided at one side of the ejection bin body, and the first elastic element, the slider and the second elastic element are all sleeved on the guide rod. On the one hand, the guide rod is used for mounting the first elastic element, the slider and the second elastic element; on the other hand, the guide rod can limit the sliding track of the slider and has a guiding function. The slider is provided between the first elastic element and the second elastic element, and both ends of the slider are abutted against the first elastic element and the second elastic element, respectively, and the slider is slidable along the guide rod under the action of the first elastic element and the second elastic element. The first elastic element and the second elastic element are provided at both ends of the slider, which can push the slider to slide on the one hand and play a bidirectional shockproof role on the other hand. In the double-shockproof spring according to the present invention, the sliding process of the slider is stable, and the first elastic element and the second elastic element have obvious shockproof effect.

Another object of the present invention is to provide a cam ejection mechanism to solve the technical problems in the prior art that the traditional pet snack machine cannot project snacks because there is no projecting mechanism. Many technical effects that can be produced by the preferred technical scheme among many technical schemes according to the present invention (the ejection cam comprises a main wheel and arc-shaped blades, and the slider is provided with an abutting part, which can convert the rotation process of the output shaft of the power device into the periodic sliding process of the slider, with simple structure and remarkable transmission effect; the shape of the output shaft of the power device is matched with the shape of the mounting groove, and the threaded fastener is threadedly connected with the second connecting hole through the first connecting hole, so that the output shaft of the power device is connected with the ejection cam more firmly, which effectively prevents the ejection cam from separating from the power device and further improves the transmission effect; the abutting part comprises a mounting post, and the abutting wheel is detachably mounted on the mounting post for being abutted against the arc-shaped blade, with simple structure and remarkable transmission effect, etc.) will be described in detail hereinafter.

In order to achieve the above object, the present invention provides the following technical scheme.

The present invention provides a cam ejection mechanism, comprising a power device, an ejection cam, a pushing plate and the double-shockproof spring mechanism, wherein: the power device is in transmission connection with the ejection cam, the ejection cam is capable of being abutted against the slider and pushing the slider to slide along the guide rod so as to deform the first elastic element, and the slider is detachable from the ejection cam so that the first elastic element drives the slider to slide reversely along the guide rod; the pushing plate is connected with the slider and slides synchronously with the slider.

Preferably, the ejection cam comprises a main wheel and arc-shaped blades connected with the main wheel, at least one arc-shaped blade is provided, all the arc-shaped blades are circumferentially provided with respect to the main wheel, the slider is provided with an abutting part, and the arc-shaped blades are capable of being against the abutting part.

Preferably, a mounting groove is provided at the middle position of the side surface of the ejection cam near the power device, the output shaft of the power device is inserted into the mounting groove, and the shape of the output shaft of the power device is matched with the shape of the mounting groove; a first connecting hole is provided at the middle position of the side surface of the ejection cam far away from the power device, the first connecting hole is communicated with the mounting groove, a second connecting hole is provided on the end surface of the output shaft of the power device, and a threaded fastener is threadedly connected with the second connecting hole through the first connecting hole, so that the ejection cam is detachably connected with the output shaft.

Preferably, the abutting part comprises a mounting post, an abutting wheel is detachably mounted on the mounting post, and the abutting wheel is capable of being abutted against the arc-shaped blade.

The cam ejection mechanism according to the present invention has at least the following beneficial effects.

The cam ejection mechanism comprises a power device, an ejection cam, a pushing plate and a double-shockproof spring mechanism, wherein the power device is in transmission connection with the ejection cam and provides power for projecting pet snacks. The ejection cam is capable of being abutted against the slider and pushing the slider to slide along the guide rod so as to deform the first elastic element, the slider is detachable from the ejection cam so that the first elastic element drives the slider to slide reversely along the guide rod, and the pushing plate is connected with the slider and slides synchronously with the slider. When the ejection cam is abutted against and pushes the slider to slide, the kinetic energy provided by the power device is converted into elastic potential energy of the first elastic element. When the slider is detachable from the ejection cam, the slider is driven by the first elastic element to slide reversely and projects pet snacks on the pushing plate. The elastic potential energy of the first elastic element is converted into kinetic energy of the pushing plate. The present invention can realize the automatic projection of pet snacks through the power device, the ejection cam and the double-shockproof spring mechanism, and the projection process is stable. At the same time, the ejection cam can convert the uniform rotation of the output shaft of the power device into the linear reciprocating sliding of the slider, and can realize the continuous projection of a plurality of pet snacks.

Still another object of the present invention is to provide a cam ejection mechanism to solve the technical problems in the prior art that the traditional pet food projecting machine cannot project snacks because there is no projecting mechanism. Many technical effects that can be produced by the preferred technical scheme among many technical schemes according to the present invention (a first mounting block and a second mounting block are provided on the outer wall of the ejection bin body, and the first mounting block and the second mounting block are matched with each other, so that on the one hand, the guide rod is more stably mounted, and on the other hand, the first mounting block and the second mounting block are matched with the first elastic element and the second elastic element, respectively, for pushing and damping the slider; a mounting part is provided on the outer wall of the ejection bin body, a limit switch is provided on the mounting part, and the limit switch can obtain the position information of the slider and control the on/off of the power device, etc.) will be described in detail hereinafter.

In order to achieve the above object, the present invention provides the following technical scheme.

The present invention provides a single-side guide rail ejection bin, comprising an ejection bin body and the cam ejection mechanism, wherein: an ejection channel is provided inside the ejection bin body, a first guide rail is provided on the side wall of the ejection bin body in the direction of the ejection channel, and the first guide rail is communicated with the ejection channel; the pushing plate is provided inside the ejection channel, one end of the slider is abutted against the ejection cam, and the other end of the slider is connected with the pushing plate through the first guide rail.

Preferably, a first mounting block and a second mounting block are provided on the outer side wall of the ejection bin body; both ends of the guide rod are provided on the first mounting block and the second mounting block, respectively; both ends of the first elastic element respectively are abutted against the first mounting block and the slider; both ends of the second elastic element are abutted against the second mounting block and the mounting sleeve, respectively.

Preferably, the single-side guide rail ejection bin further comprises a limit switch, and a mounting part is provided on the outer side wall of the ejection bin body, wherein: the limit switch is provided on the mounting part, the limit switch is electrically connected with the power device, and the slider is capable of being abutted against the limit switch to turn off the power device.

The single-side guide rail ejection bin according to the present invention has at least the following beneficial effects.

The single-side guide rail ejection bin comprises an ejection bin body and a cam ejection mechanism, wherein the ejection bin body is used for mounting the cam ejection mechanism on the one hand and can hold snacks to be projected on the other hand; an ejection channel is provided inside the ejection bin body, and the ejection channel can limit the ejection track of pet snacks; a first guide rail is provided on the side wall of the ejection bin body in the direction of the ejection channel, the first guide rail is communicated with the ejection channel, and the cam ejection mechanism comprises a driving device, a slider and a pushing plate. The pushing plate is provided inside the ejection channel. One end of the slider is in transmission connection with the driving device, and the other end of the slider is connected with the pushing plate through the first guide rail. The driving device provides and transmits power to the slider, the slider and the first guide rail are matched with each other, and the pushing plate and the ejection channel are matched with each other, so that pet snacks can be projected in a specified direction; the slider can drive the pushing plate to move back and forth along the ejection channel under the driving of the driving device, so that pet snacks can be projected for many times; the present invention not only can realize the projection of pet snacks, but also has a stable projection process, which can greatly increase the interaction with pets on the basis of feeding.

BRIEF DESCRIPTION OF THE DRAWINGS

In order to explain the embodiments of the present invention or the technical scheme in the prior art more clearly, the drawings used in the embodiments or the description of the prior art will be briefly introduced hereinafter. Obviously, the drawings in the following description are only some embodiments of the present invention. For those skilled in the art, other drawings can be obtained according to these drawings without paying creative labor.

DESCRIPTION OF THE EMBODIMENTS

In order to make the object, technical scheme and advantages of the present invention clearer, the technical scheme of the present invention will be described in detail hereinafter. Obviously, the described embodiments are only some embodiments of the present invention, rather than all of the embodiments. Based on the embodiments of the present invention, all other embodiments obtained by those skilled in the art without paying creative labor belong to the scope of protection of the present invention.

Embodiment 1

Figure 1:
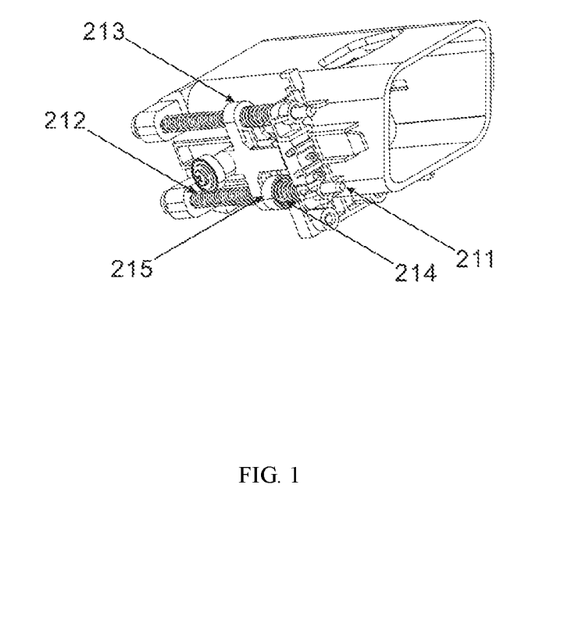
FIG. 1 is a schematic structural diagram of a double-shockproof spring mechanism according to the present invention.
Figure 2:
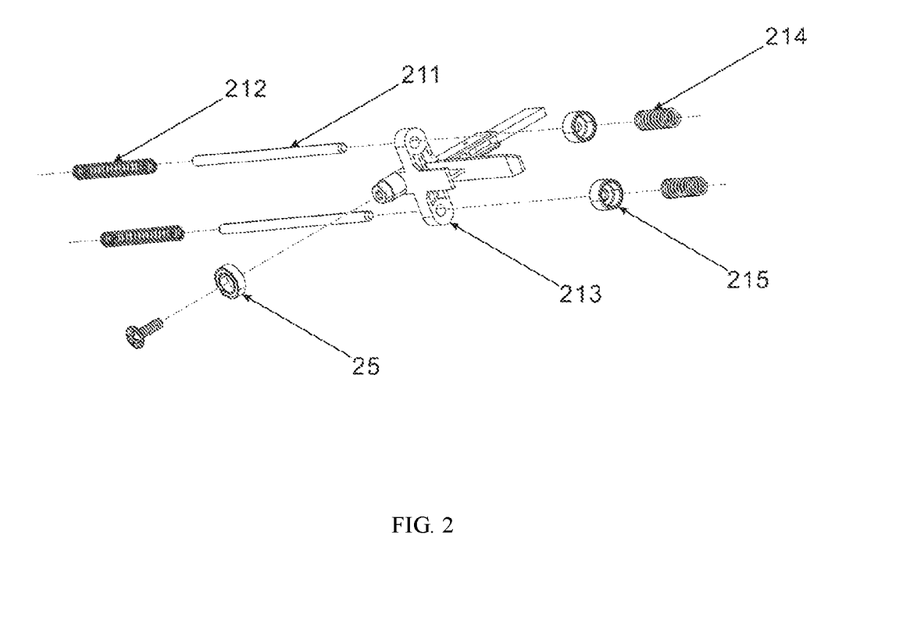
FIG. 2 is an exploded diagram of the structure of a double-shockproof spring mechanism according to the present invention.
Figure 3:
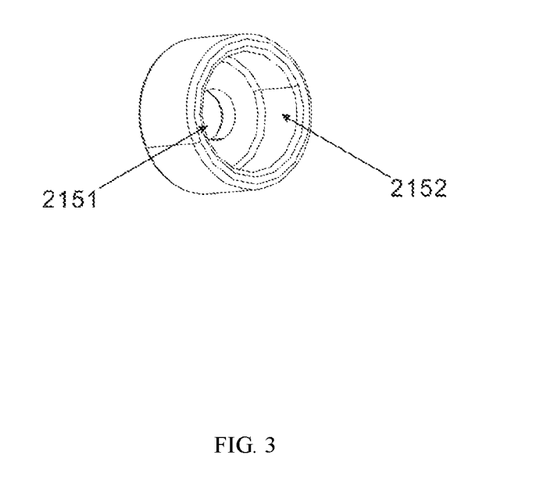
FIG. 3 is a schematic structural diagram of a mounting sleeve according to the present invention.

The present invention provides a double-shockproof spring mechanism, as shown in FIG. 1-FIG. 3. The double-shockproof spring mechanism 21 comprises a guide rod 211, a first elastic element 212, a slider 213 and a second elastic element 214, wherein the first elastic element 212 and the second elastic element 214 are provided as springs, wherein: the guide rod 211 is provided at one side of the ejection bin body 1; the first elastic element 212, the slider 213 and the second elastic element 214 are all sleeved on the guide rod 211, the slider 213 is provided between the first elastic element 212 and the second elastic element 214, both ends of the slider are respectively abutted against the first elastic element 212 and the second elastic element 214, and the slider 213 is slidable along the guide rod 211 under the action of the first elastic element 212 and the second elastic element 214.

When in use, the slider 213 slides under the action of the driving device of the snack projection bin, and the first elastic element 212 or the second elastic element 214 deforms. After the slider is released by the driving device of the snack projection bin, the slider 213 slides along the guide rod 211 under the action of the first elastic element 212 and the second elastic element 214. In the whole process, the slider 213 slides along the guide rod 211, the sliding track is fixed, and the process is stable. The first elastic element 212 or the second elastic element 214 not only can provide the pushing power of the slider 213, but also can effectively buffer the buffering force of the slider 213 after snacks are projected. The process is stable and the shockproof effect is remarkable.

As an alternative embodiment, as shown in FIG. 1 and FIG. 2, the double-shockproof spring mechanism 21 comprises a mounting sleeve 215, the mounting sleeve 215 is sleeved on the guide rod 211, the mounting sleeve 215 is provided between the slider 213 and the second elastic element 214, the number of the mounting sleeves 215, the guide rods 211, the first elastic elements 212 and the second elastic elements 214 are all set to two, and two sliding holes 2132 penetrate through the end surface of the slider 213, wherein: the two guide rods 211 are provided on one side of the ejection bin body 1 in parallel and pass through the corresponding sliding holes 2132, respectively; the two first elastic elements 212 are sleeved on the corresponding guide rods 211 and are abutted against the sliders 213, respectively; the two second elastic elements 214 are sleeved on the corresponding guide rods 211 and are abutted against the sliders 213 through the corresponding mounting sleeves 215, respectively.

As an alternative embodiment, as shown in FIG. 3, a guide hole 2151 penetrates through the end surface of the mounting sleeve 215, the aperture of the guide hole 2151 is matched with the diameter of the guide rod 211, and the mounting sleeve 215 is sleeved on the guide rod 211 through the guide hole 2151, so that the mounting sleeve 215 is slidable more stably with respect to the guide rod 211.

The mounting sleeve 215 is provided with a mounting hole 2152, and a center line of the mounting hole 2152 and a center line of the guide hole 2151 are provided on the same straight line; the aperture of the mounting hole 2152 is larger than the outer diameter of the second elastic element 214, and the end of the second elastic element 214 is provided in the mounting hole 2152; one end of the second elastic element 214 is provided in the mounting hole 2152.

Embodiment 2

Figure 4:
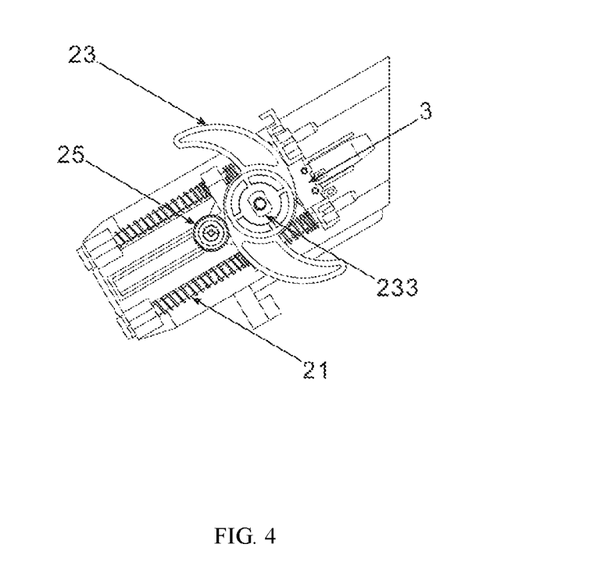
FIG. 4 is a schematic structural diagram of a double-shockproof spring mechanism and an ejection cam according to the present invention.
Figure 5:
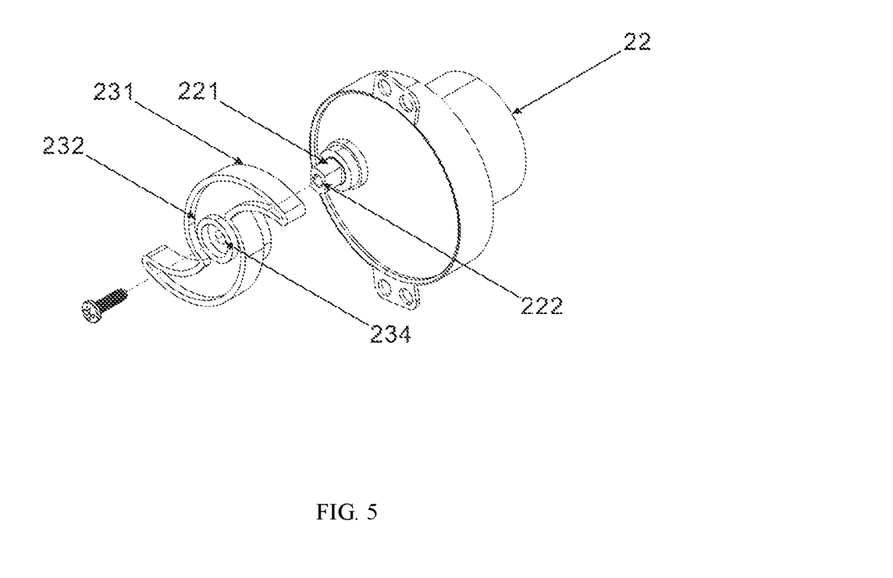
FIG. 5 is a schematic structural diagram of an ejection cam and a power device according to the present invention.
Figure 6:
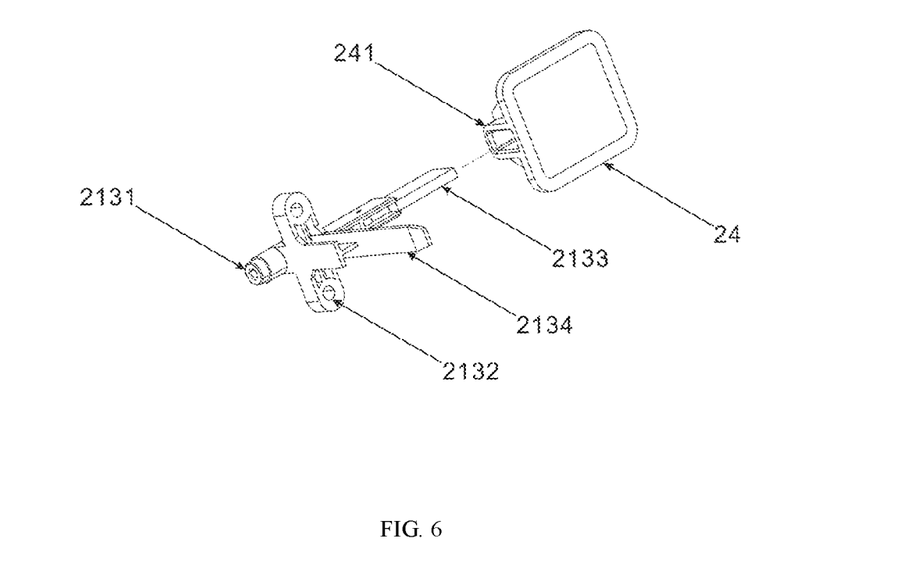
FIG. 6 is an exploded diagram of the structure of a slider and a pushing plate according to the present invention.

Embodiment 2 is based on embodiment 1: the present invention provides a cam ejection mechanism, as shown in FIGS. 4-6. The cam ejection mechanism 2 comprises a power device 22, an ejection cam 23, a pushing plate 24 and the double-shockproof spring mechanism 21, wherein the power device 22, the ejection cam 23 and the double-shockproof spring mechanism 21 are provided at one side of the ejection bin body 1, and the pushing plate 24 is provided inside the ejection bin body 1, wherein: the power device 22 is provided as a motor, the power device 22 is in transmission connection with the ejection cam 23, the ejection cam 23 is capable of being abutted against the slider 213 and pushing the slider 213 to slide along the guide rod 211 so as to deform the first elastic element 212, and the slider 213 is detachable from the ejection cam 23 so that the first elastic element 212 drives the slider 213 to slide reversely along the guide rod 211; the pushing plate 24 is connected with the slider 213 and slides synchronously with the slider 213.

When in use, the power device 22 drives the ejection cam 23 to rotate, the ejection cam 23 is abutted against the slider 213 and pushes the slider 213 to slide along the guide rod 211. The sliding slider 213 drives the first elastic element 212 to deform. At this time, the kinetic energy of the power device 22 is converted into the elastic potential energy of the first elastic element 212, and then the ejection cam 23 continues to rotate and is detachable from the slider 213. Under the action of the first elastic element 212, the slider 213 moves reversely along the guide rod 211. The pushing plate 24 moves synchronously with the slider 213 and projects pet snacks. At this time, the elastic potential energy of the first elastic element 212 is converted into the kinetic energy of the pushing plate 24. When the output shaft of the power device 22 continuously rotates, the ejection cam 23 and the double-shockproof spring mechanism 21 can convert the uniform rotation of the output shaft of the power device 22 into the periodic reciprocating motion of the pushing plate 24. In the cam ejection mechanism 2 according to the present invention, the ejection cam 23 and the slider 213 are matched to form a cam mechanism, which can effectively convert the rotation of the output shaft of the power device 22 into the linear sliding of the slider 213, and drive the first elastic element 212 to deform so that the first elastic element 212 forms a thrust elastic element and directly provides projection power for pet snacks. In this way, the second elastic element 214 forms a buffer elastic element and the projection process is more stable, which not only can realize the automatic projection of pet snacks with a stable projection process, but also can realize the periodic and continuous projection of pet food with strong interactivity.

As an alternative embodiment, as shown in FIG. 4 and FIG. 5, the ejection cam 23 comprises a main wheel 232 and arc-shaped blades 231 connected with the main wheel 232, at least one arc-shaped blade 231 is provided, all the arc-shaped blades 231 are circumferentially provided with respect to the main wheel 232, the slider 213 is provided with an abutting part, and the arc-shaped blades 231 are capable of being against the abutting part. Preferably, the number of the arc-shaped blades 231 is set to two, and the two arc-shaped blades 231 are evenly circumferentially distributed with respect to the main wheel 232.

Preferably, the curvature of the arc-shaped blade 231 gradually increases in the direction away from the main wheel 232, and the outer side surface of the arc-shaped blade 231 can be abutted against the abutting part; and the ejection cam 23 rotates reversely in the deflection direction of the arc-shaped blade 231. As shown in FIG. 4, the ejection cam 23 rotates clockwise, and its outer side surface pushes the slider 213 to slide along the guide rod 211, so that the sliding process is stable without obstacles.

As an alternative embodiment, as shown in FIG. 5, a mounting groove 233 is provided at the middle position of the side surface of the ejection cam 23 near the power device 22, the output shaft 221 of the power device 22 is inserted into the mounting groove 233, the shape of the output shaft 221 of the power device 22 is matched with the shape of the mounting groove 233, and the shape of the output shaft 221 and the shape of the mounting groove 233 are both provided in the shape of a rounded rectangle.

As shown in FIG. 5 and FIG. 6, a first connecting hole 234 is provided at the middle position of the side surface of the ejection cam 23 far away from the power device 22, the first connecting hole 234 is communicated with the mounting groove 233, a second connecting hole 222 is provided on the end surface of the output shaft 221 of the power device 22, and a threaded fastener is threadedly connected with the second connecting hole 222 through the first connecting hole 234, so that the ejection cam 23 is detachably connected with the output shaft 221. A limiting groove is provided at the side of the ejection cam 23 away from the power device 22, the center line of the limiting groove and the center line of the first connecting hole 234 are provided on the same straight line. When the output shaft 221 is connected with the ejection cam 23, the stud of the threaded fastener passes through the first connecting hole 234 and is placed in the second connecting hole 222, and the screw head of the threaded fastener is placed in the limiting groove.

As an alternative embodiment, as shown in FIG. 6, a push rod 2133 is provided on the side of the slider 213 opposite to the abutting part, and a mounting frame 241 is provided on the pushing plate 24. The push rod 2133 is detachably mounted on the push rod 2133 through the mounting frame 241, and the mounting frame 241 is provided with a mounting hole. The middle section of the push rod 2133 is provided as a mounting section. The push rod 2133 passes through the mounting hole. Fixing holes are provided at corresponding positions of the mounting frame 241 and the mounting section. The pushing plate 24 is detachably provided on the mounting section by bolts through the two fixing holes.

As shown in FIG. 6, the abutting part comprises a mounting post 2131, an abutting wheel 25 is detachably mounted on the mounting post 2131, and the abutting wheel 25 is capable of being abutted against the arc-shaped blade 231.

Embodiment 3

Figure 7:
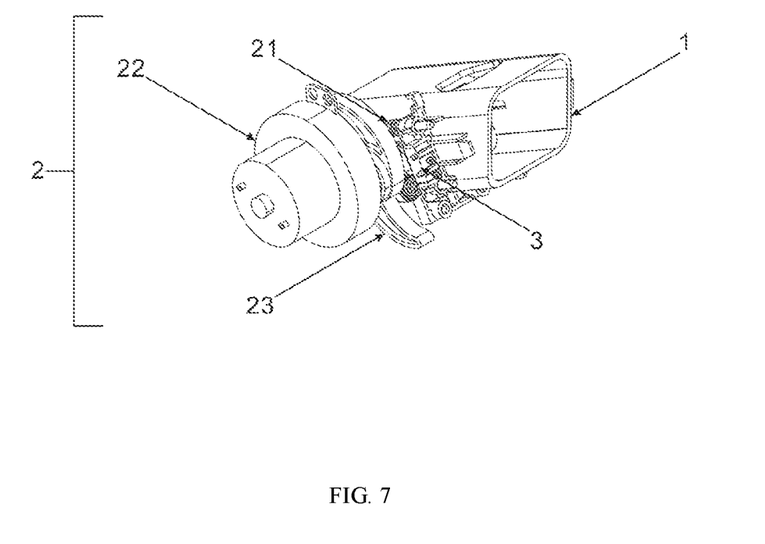
FIG. 7 is a schematic structural diagram of a single-side guide rail ejection bin according to the present invention.
Figure 8:
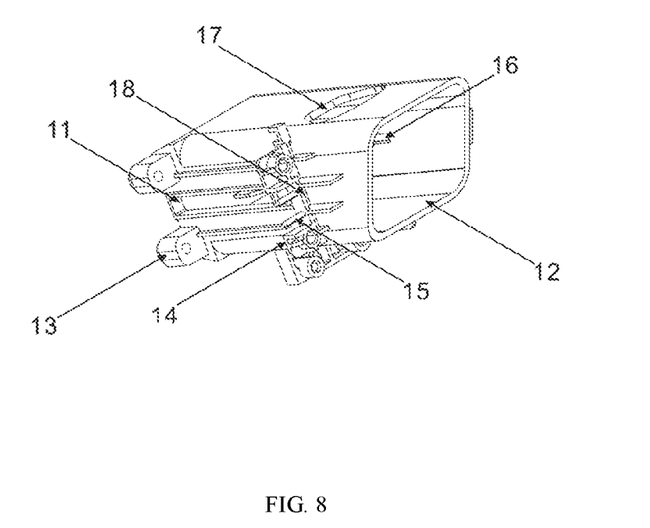
FIG. 8 is a schematic structural diagram of an ejection bin body according to the present invention.
Figure 9:
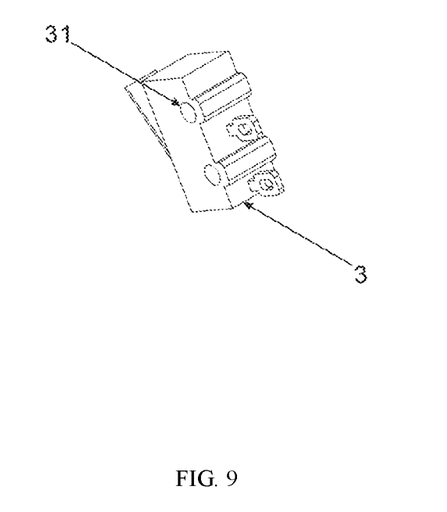
FIG. 9 is a schematic structural diagram of a limit switch according to the present invention.

Embodiment 3 is based on embodiment 2: the present invention provides a single-side guide rail ejection bin, as shown in FIG. 7-FIG. 9. The single-side guide rail ejection bin comprises an ejection bin body 1 and the cam ejection mechanism 2, wherein: an ejection channel 12 is provided inside the ejection bin body 1, the ejection channel 12 is inclined upward in the direction close to the discharge port, a first guide rail 11 is provided on the side wall of the ejection bin body 1 in the direction of the ejection channel 12, and the first guide rail 11 is communicated with the ejection channel 12; the pushing plate 24 is provided inside the ejection channel 12, the size of the pushing plate 24 is matched with that of the ejection channel 12, a feed inlet 17 is provided at the top of the ejection bin body 1, and pet snacks entering from the feed inlet 17 can fall onto the pushing plate 24 at the initial position; one end of the slider 213 is abutted against the ejection cam 23, and the other end of the slider 213 is connected with the pushing plate 24 through the first guide rail 11.

When in use, pet snacks enter the ejection channel 12 from the feed inlet 17 and fall onto the pushing plate 24. The ejection cam 23 and the first elastic element 212 cooperate with each other to drive the slider 213 to slide back and forth along the guide rod 211. The pushing plate 24 slides back and forth along the ejection channel 12 to project pet snacks from the discharge port of the ejection channel 12. In the present invention, the cam ejection mechanism 2 not only can project the pet snacks, but also can continuously project the pet snacks for many times by the reciprocating motion of the slider 213. The slider 213 cooperates with the first guide rail 11, and the ejection channel 12 cooperates with the pushing plate 24, so that the projection process of pet snacks is more stable.

As an alternative embodiment, a first mounting block 13 and a second mounting block 14 are provided on the outer side wall of the ejection bin body 1; both ends of the guide rod 211 are provided on the first mounting block 13 and the second mounting block 14, respectively; both ends of the first elastic element 212 respectively are abutted against the first mounting block 13 and the slider 213; one end of the second elastic element 214 is abutted against the second mounting block 14, and the other end of the second elastic element 214 is abutted against the slider 213 through the mounting sleeve 215. On the one hand, the first elastic element 212 has a pushing function for pushing the slider 213, while on the other hand, it has a damping function. The second elastic element 214 is mainly used for damping.

As an alternative embodiment, as shown in FIGS. 7-9, the single-side guide rail ejection bin further comprises a limit switch 3, and a mounting part is provided on the outer side wall of the ejection bin body 1, wherein: the limit switch 3 is provided on the mounting part, the mounting part is provided at the position between the two guide rods 211 and located close to the guide rods 211, the limit switch 3 is electrically connected with the power device 22, and the slider 213 is capable of being abutted against the limit switch 3 to turn off the power device 22.

In the process of projecting pet snacks, the first elastic element 212 drives the pushing plate 24 to slide through the slider 213. When the projection action is completed, the slider 213 can be abutted against the contact member of the limit switch 3 so that the limit switch 3 controls the power device 22 to be turned off.

As an alternative embodiment, as shown in FIG. 8, the mounting part comprises two fixing posts 15, the limit switch 3 is provided with two fixing holes 31, and the fixing posts 15 are provided in the corresponding fixing holes 31.

As shown in FIG. 8, two fixing posts 15 are provided on the mounting plate, and both ends of the mounting plate are fixedly connected with two second mounting blocks 14, respectively. A chute 18 is formed between the mounting plate and the outer wall of the ejection bin body 1. A sliding strip 2134 is provided on the slider 213, and the sliding strip 2134 is inserted into the chute 18 and is slidable along the chute 18. The sliding strip 2134 is provided in parallel to the guide rod 211, further improving the sliding stability of the slider 213.

The above is only the specific embodiment of the present invention, but the protection scope of the present invention is not limited thereto. Any changes or substitutions conceivable to those skilled in the art within the technical scope disclosed by the present invention should be covered within the protection scope of the present invention. Therefore, the protection scope of the present invention shall be subject to the protection scope of the claims.

What is claimed is:

1. A cam ejection mechanism (2) comprising:
a power device (22);
an ejection cam (23);
a pushing plate (24); and
a double-shockproof spring mechanism (21);
wherein the double-shockproof spring mechanism (21) further comprises a guide rod (211), a first elastic element (212), a slider (213) and a second elastic element (214);
wherein the power device (22) is in transmission connection with the ejection cam (23), the ejection cam (23) is capable of being abutted against the slider (213) and pushing the slider (213) to slide along the guide rod (211) so as to deform the first elastic element (212), and the slider (213) is detachable from the ejection cam (23) so that the first elastic element (212) drives the slider (213) to slide reversely along the guide rod (211);
wherein the pushing plate (24) is connected with the slider (213) and slides synchronously with the slider (213);
wherein the guide rod (211) is provided at one side of an ejection bin body (1); and
wherein the first elastic element (212), the slider (213) and the second elastic element (214) are all sleeved on the guide rod (211), the slider (213) is provided between the first elastic element (212) and the second elastic element (214), both ends of the slider are respectively abutted against the first elastic element (212) and the second elastic element (214), and the slider (213) is slidable along the guide rod (211) under the action of the first elastic element (212) and the second elastic element (214).

2. The double-shockproof spring mechanism (21) according to claim 1, wherein the double-shockproof spring mechanism (21) comprises a mounting sleeve (215), the mounting sleeve (215) is sleeved on the guide rod (211), the mounting sleeve (215) is provided between the slider (213) and the second elastic element (214), the mounting sleeve (215), the guide rod (211), the first elastic element (212) and the second elastic element (214) are all set to two, and two sliding holes (2132) penetrate through the end surface of the slider (213), wherein:
two guide rods (211) are provided on one side of the ejection bin body (1) in parallel and pass through the corresponding sliding holes (2132), respectively;
two first elastic elements (212) are sleeved on the corresponding guide rod (211) and are abutted against two sliders (213), respectively;
two second elastic elements (214) are sleeved on the corresponding guide rod (211) and are abutted against two sliders (213) through the corresponding mounting sleeve (215), respectively.

3. The double-shockproof spring mechanism according to claim 2, wherein a guide hole (2151) and a mounting hole (2152) penetrate through the end surface of the mounting sleeve (215), wherein:

a center line of the mounting hole (2152) and a center line of the guide hole (2151) are provided on the same straight line;

the aperture of the guide hole (2151) is matched with the diameter of the guide rod (211), and the mounting sleeve (215) is sleeved on the guide rod (211) through the guide hole (2151);

the aperture of the mounting hole (2152) is larger than the outer diameter of the second elastic element (214), and the end of the second elastic element (214) is provided in the mounting hole (2152).

4. The cam ejection mechanism according to claim 1, wherein the ejection cam (23) comprises a main wheel (232) and at least one arc-shaped blade (231) connected with the main wheel (232)[[,]]; wherein the at least one arc-shaped blade (231) is circumferentially provided with respect to the main wheel (232), the slider (213) is provided with an abutting part (25), and the at least one arc-shaped blade (231) is capable of being against the abutting part (25).

5. The cam ejection mechanism according to claim 4, wherein a mounting groove (233) is provided at the middle position of the side surface of the ejection cam (23) near the power device (22), the output shaft (221) of the power device (22) is inserted into the mounting groove (233), and the shape of the output shaft (221) of the power device (22) is matched with the shape of the mounting groove (233);

a first connecting hole (234) is provided at the middle position of the side surface of the ejection cam (23) far away from the power device (22), the first connecting hole (234) is communicated with the mounting groove (233), a second connecting hole (222) is provided on the end surface of the output shaft (221) of the power device (22), and a threaded fastener is threadedly connected with the second connecting hole (222) through the first connecting hole (234), so that the ejection cam (23) is detachably connected with the output shaft (221).

6. The cam ejection mechanism according to claim 4, wherein the abutting part comprises a mounting post (2131), an abutting wheel (25) is detachably mounted on the mounting post (2131), and the abutting wheel (25) is capable of being abutted against the arc-shaped blade (231).

7. A single-side guide rail ejection bin, comprising the ejection bin body (1) and the cam ejection mechanism (2) according to claim 1, wherein:

an ejection channel (12) is provided inside the ejection bin body (1), a first guide rail (11) is provided on the side wall of the ejection bin body (1) in the direction of the ejection channel (12), and the first guide rail (11) is communicated with the ejection channel (12);

the pushing plate (24) is provided inside the ejection channel (12), one end of the slider (213) is abutted against the ejection cam (23), and the other end of the slider (213) is connected with the pushing plate (24) through the first guide rail (11).

8. The single-side guide rail ejection bin according to claim 7, wherein a first mounting block (13) and a second mounting block (14) are provided on the outer side wall of the ejection bin body (1);

both ends of the guide rod (211) are provided on the first mounting block (13) and the second mounting block (14), respectively;

both ends of the first elastic element (212) respectively are abutted against the first mounting block (13) and the slider (213);

both ends of the second elastic element (214) are abutted against the second mounting block (14) and the mounting sleeve (215), respectively.

9. The single-side guide rail ejection bin according to claim 7, wherein the single-side guide rail ejection bin further comprises a limit switch (3), and a mounting part is provided on the outer side wall of the ejection bin body (1), wherein:

the limit switch (3) is provided on the mounting part, the limit switch (3) is electrically connected with the power device (22), and the slider (213) is capable of being abutted against the limit switch (3) to turn off the power device (22).

\* \* \* \* \*